US011403646B2

(12) United States Patent
Seal

(10) Patent No.: US 11,403,646 B2
(45) Date of Patent: Aug. 2, 2022

(54) SECURE PIN ENTRY VIA MOBILE DEVICE

(71) Applicant: Shopify Inc., Ottawa (CA)

(72) Inventor: David Grant Seal, Ottawa (CA)

(73) Assignee: Shopify Inc., Ottawa (CA)

( * ) Notice: Subject to any disclaimer, the term of this patent is extended or adjusted under 35 U.S.C. 154(b) by 187 days.

(21) Appl. No.: 16/290,825

(22) Filed: Mar. 1, 2019

(65) Prior Publication Data
US 2020/0279265 A1 Sep. 3, 2020

(51) Int. Cl.
*G06Q 20/20* (2012.01)
*G06Q 20/40* (2012.01)
*G06Q 20/32* (2012.01)

(52) U.S. Cl.
CPC ........ *G06Q 20/409* (2013.01); *G06Q 20/20* (2013.01); *G06Q 20/327* (2013.01); *G06Q 20/4012* (2013.01); *G06Q 20/40145* (2013.01)

(58) Field of Classification Search
CPC ........ G06Q 40/00; G06Q 20/00; G06Q 20/20; G06Q 20/327; G06Q 20/4012; G06Q 20/40145; G06K 20/409
See application file for complete search history.

(56) References Cited

U.S. PATENT DOCUMENTS

| | | | |
|---|---|---|---|
| 7,761,381 B1* | 7/2010 | Fitch | G06Q 20/40 705/44 |
| 10,586,227 B2* | 3/2020 | Makhdumi | G06Q 20/204 |
| 2002/0017559 A1* | 2/2002 | Mos | G06K 7/084 235/380 |
| 2005/0256806 A1* | 11/2005 | Tien | G06Q 20/3823 705/64 |
| 2012/0039469 A1* | 2/2012 | Mueller | G06Q 20/12 380/252 |
| 2013/0023241 A1* | 1/2013 | Lim | H04W 12/06 455/411 |
| 2013/0031006 A1* | 1/2013 | McCullagh | G06Q 20/36 705/66 |
| 2013/0282582 A1* | 10/2013 | Pereira | G06Q 20/20 705/44 |
| 2017/0083985 A1* | 3/2017 | Lacoss-Arnold | G06Q 40/12 |
| 2019/0095990 A1* | 3/2019 | Sarir | G06Q 20/3221 |

* cited by examiner

*Primary Examiner* — Bennett M Sigmond
*Assistant Examiner* — Xavier M. Bennett
(74) *Attorney, Agent, or Firm* — GTC Law Group PC & Affiliates

(57) ABSTRACT

Point-of-sale (POS) e-commerce transaction verification via a mobile device such as a smart phone, smart watch, tablet, PC, appliance or personal assistant rather than numeric keypad on POS device. Near field communication (NFC), quick response (QR) code, push notification and executable application embodiments disclosed.

30 Claims, 8 Drawing Sheets

Fig. 2

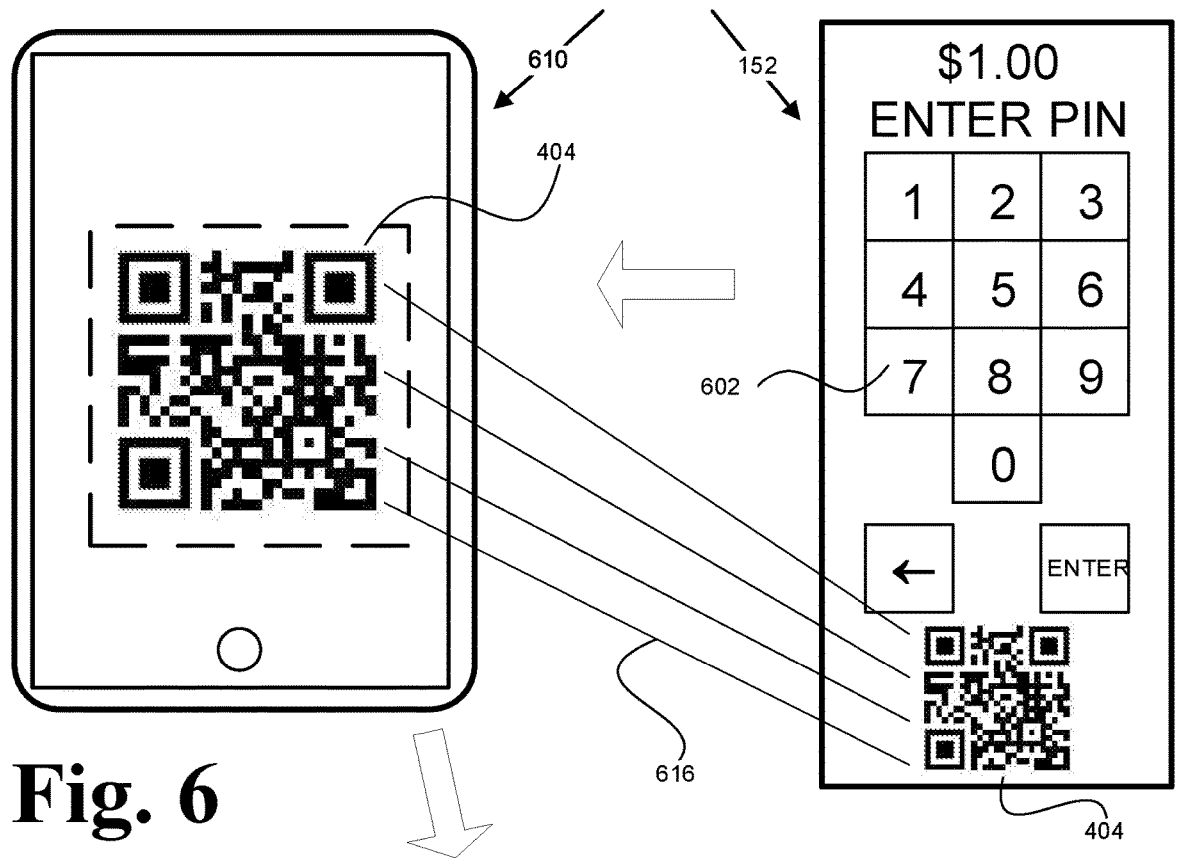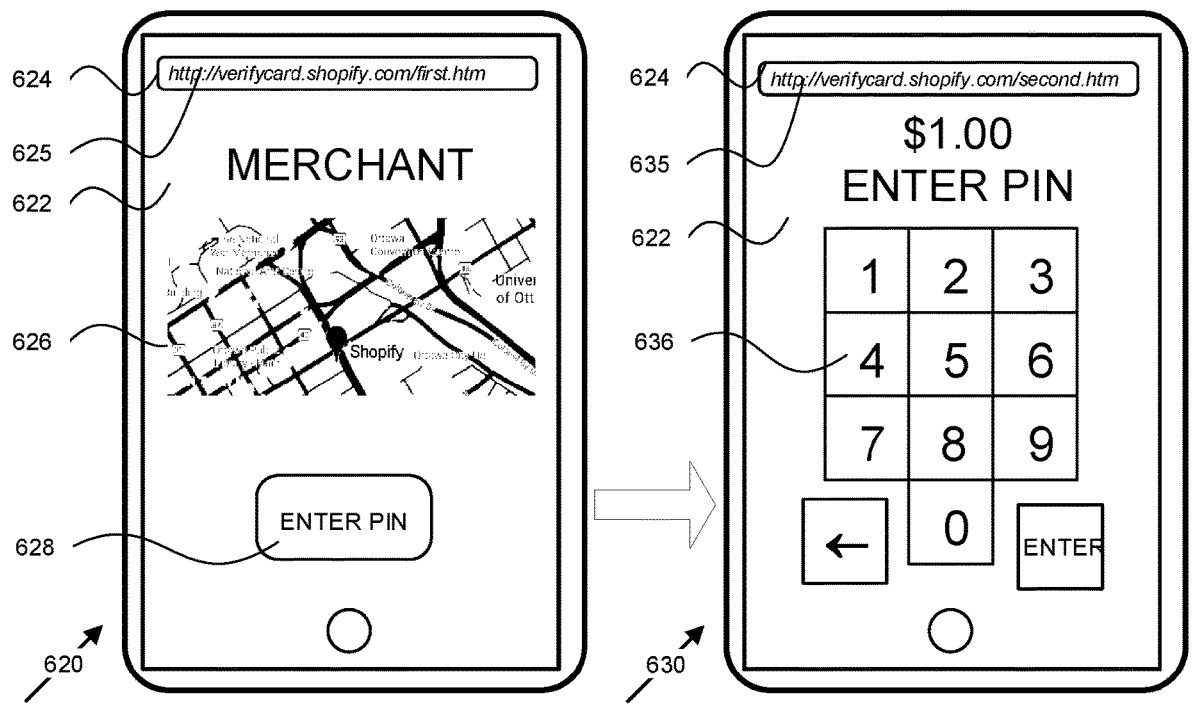
Fig. 6

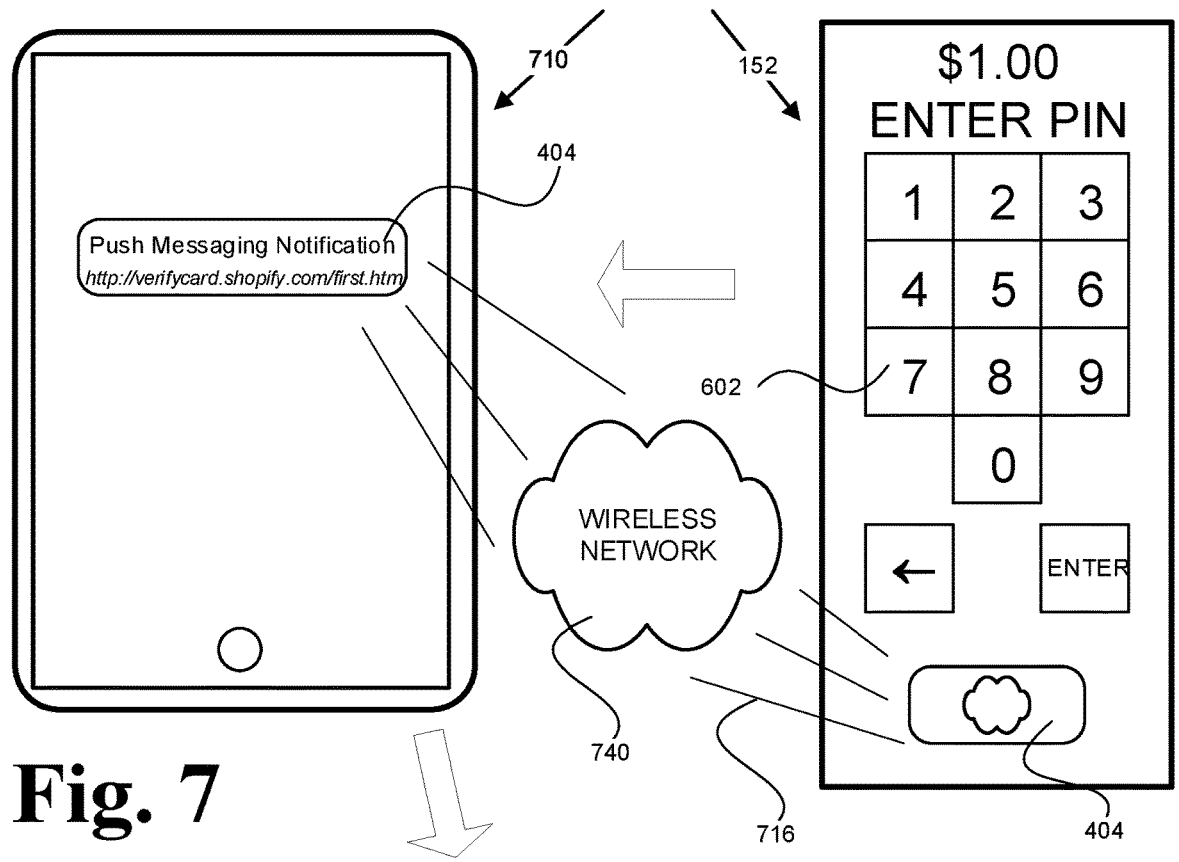
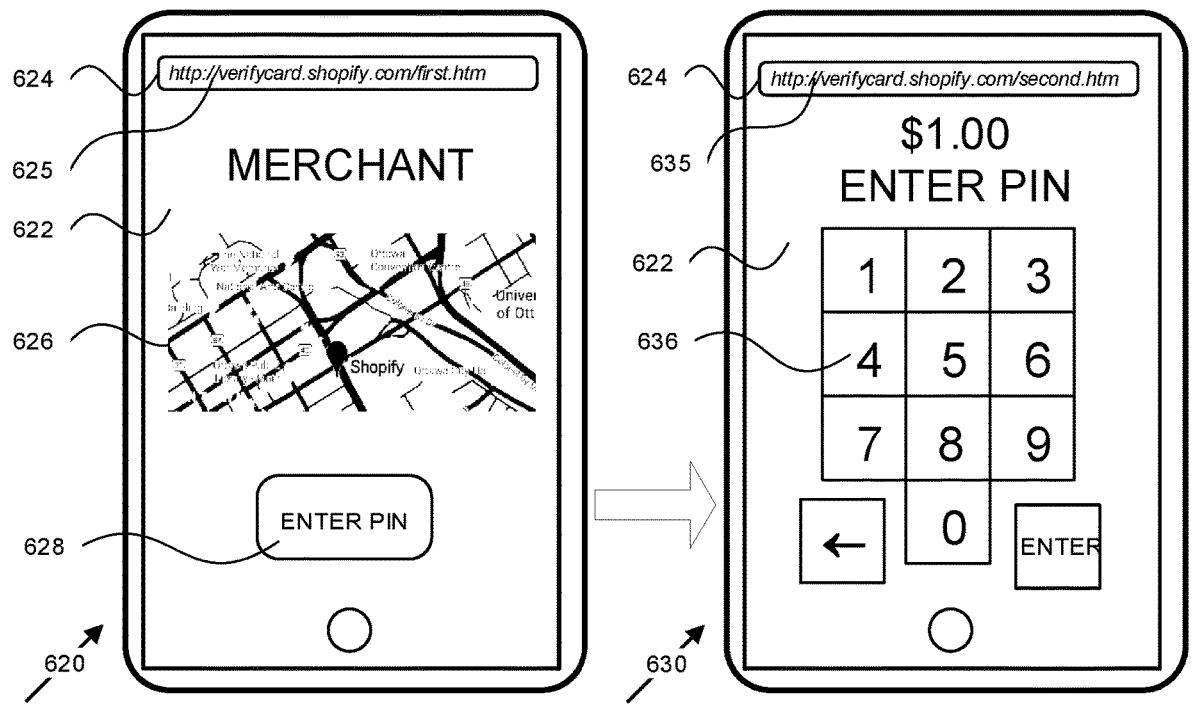
Fig. 7

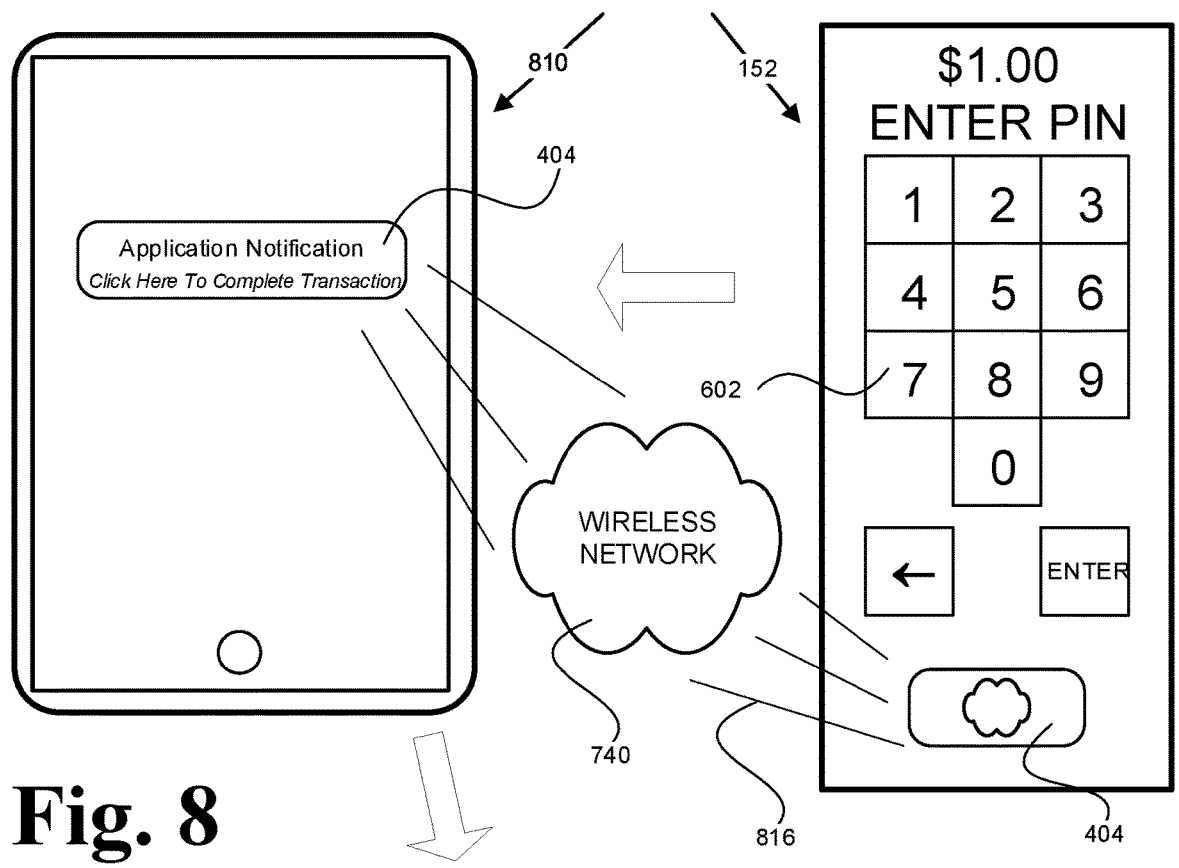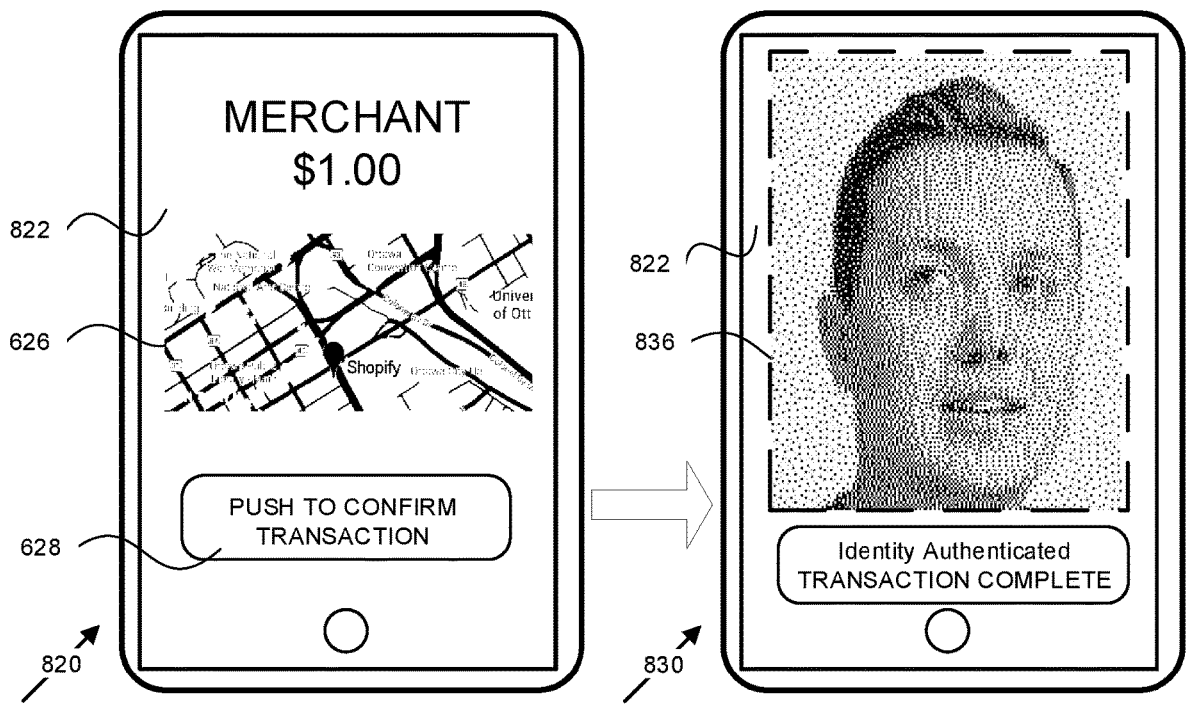
Fig. 8

SECURE PIN ENTRY VIA MOBILE DEVICE

FIELD

The present disclosure relates generally to advancements in verification of transactions in an e-commerce environment, and more particularly to advanced ways for card verification and providing a secure code (e.g. personal identification number or PIN) by a customer to authorize a transaction.

BACKGROUND

Modern point-of-sale (POS) systems and e-commerce transactions utilizing debit, credit or pre-paid cards for payment frequently require that a customer enter or input a specific pre-designated code, or PIN, into a POS device to authorize payment of a transaction. Unfortunately, these commercial off the shelf (COTS) POS devices are frequently insecure, whether due to a lack of visual privacy when entering a PIN (e.g. watching eyes or camera surveillance), a rogue application or appliance added to the POS device that captures the PIN, or other insecure aspects of the POS device.

Various prior art attempts have been made to secure PIN input, typically by obfuscation of the buttons on a numeric keypad on a POS device. However, these prior art attempts make the entry of a PIN more difficult for a customer to verify and complete the transaction.

For example, in one prior art solution, the numbers of the keypad are randomly scrambled to different locations on the keypad for each transaction, forcing the customer to type numbers using keys in random different locations for each transaction verification. One problem with this approach is that customers tend to remember PIN numbers by a spatial location of the numbers or a pattern derived from the sequence of locations, rather than the numbers of the PIN. This in turn frequently causes a customer to try to use the spatial pattern on a scrambled keypad, rendering a failed attempt. Or worse, the customer cannot readily remember the numeric PIN or becomes confused because the customer is relying upon the spatial location or pattern rather than the actual PIN numbers.

Other attempts have been made to change the size of the number buttons or alter the alignment of rows and columns so the numbers are in slightly different locations. Again, this obfuscation only serves to make the input process of a PIN by the customer more challenging, which ultimately results in more time expended for card verification, or worse encounter complications by entering the wrong PIN. Thus, there is a need for simple, secure, user-friendly approaches to verify a transaction.

SUMMARY

In an aspect, a method of verifying a transaction may include the steps of: receiving indicia of an initiation of the transaction; generating a transaction identifier; communicating the transaction identifier; providing a verification information; and receiving an authentication information. In embodiments, the transaction identifier can be generated by a payment resource and can be associated with the verification information by the payment resource. The communicating of the transaction identifier can be to a customer device. The verification information can be provided to a customer device by a payment resource. The authentication information can be received, at least one of directly and indirectly, from a customer device. The transaction can be initiated using at least one of: a payment resource, merchant device and a POS device. The customer device can be a smart phone. The verification information can include merchant location information. The step of communicating a transaction identifier can communicate the transaction identifier from a POS device and the step of receiving authentication information can be received by a payment resource. The transaction identifier can be one or more of an alphanumeric code, a QR code, a near field communication and a push notification. The step of communicating the transaction identifier can include a push notification thereby loading a URL on a customer device. The step of communicating the transaction identifier can include a push notification thereby executing an application on a customer device. The step of receiving authentication information can follow entry of a PIN. The step of receiving authentication information can include entry of a PIN only if the transaction exceeds a pre-configured transaction amount threshold. The step of receiving authentication information can include entry of a PIN only if the transaction exceeds a pre-configured transaction risk threshold. The authentication information can include biometric recognition. The biometric recognition can be one or more of: facial, voice, iris, retina, fingerprint and gait recognition. The transaction can relate to one or more of: a debit card payment, debit card refund, credit card payment, credit card refund, pre-paid card payment, pre-paid card refund and verification of identity.

In an aspect, a method of verifying a transaction may include the steps of: receiving, at a payment resource, indicia of initiation of the transaction; generating, by the payment resource, a transaction identifier for the transaction; associating, by the payment resource, the transaction identifier with a verification information; communicating the transaction identifier to a customer device, wherein the customer device can be a wireless device; providing the verification information to the customer device; and receiving, by the payment resource, an authentication information originating from the customer device. In embodiments, the step of communicating the transaction identifier to a customer device can occur via a POS device.

In an aspect, a method of verifying a transaction may include the steps of: initiating the transaction from a payment resource, wherein the transaction can be one or more from the set containing: debit card transaction, credit card transaction, pre-paid card transaction and verification of identity; generating a transaction identifier for the transaction by the payment resource; associating the transaction identifier with a verification information by the payment resource; communicating the transaction identifier to a customer device, wherein the customer device can be a wireless device and the transaction identifier can be one or more from the set containing: alphanumeric code, QR code, near field communication and application execution push notification; providing the verification information from the payment resource to the customer device, wherein the verification information includes one or more from the set containing: merchant identity information, merchant location information, transaction amount, calculated risk and POS device information; and receiving an authentication information by the payment resource originating from the customer device, wherein the authentication information includes one or more from the set containing: a PIN and biometric recognition.

In an aspect, a method of verifying a transaction may include the steps of: receiving indicia of an initiation of the transaction; communicating a transaction identifier for retrieval of verification information; and receiving an authentication information. In embodiments, the method can further include the step of generating the transaction identifier. The method can further include the step of providing a verification information.

In an aspect, a system for verifying a transaction may include: a payment resource including at least one processor and at least one memory, the payment resource adapted to: receive indicia of an initiation of the transaction; generate a transaction identifier; communicate the transaction identifier; provide a verification information; and receive an authentication information. In embodiments, the transaction identifier can be generated by a payment resource and can be associated with the verification information by the payment resource. The transaction identifier can be communicated to a customer device. The verification information can be provided to a customer device by a payment resource. The authentication information can be received, at least one of directly and indirectly, from a customer device. The transaction can be initiated using at least one of a payment resource, merchant device and a POS device. The customer device can be a smart phone. The verification information can include merchant location information. The transaction identifier can be communicated from a POS device and the authentication information can be received by a payment resource. The transaction identifier can be one or more of an alphanumeric code, a QR code, a near field communication and a push notification. The transaction identifier when communicated can include a push notification thereby loading a URL on a customer device. The transaction identifier when communicated can include a push notification thereby executing an application on a customer device. The authentication information can follow entry of a PIN. The step of receiving authentication information can include entry of a PIN only if the transaction exceeds a pre-configured transaction amount threshold. The step of receiving authentication information can include entry of a PIN only if the transaction exceeds a pre-configured transaction risk threshold. The authentication information can include biometric recognition. The biometric recognition can be one or more of: facial, voice, iris, retina, fingerprint and gait recognition. The transaction can relate to one or more of: debit card payment, debit card refund, credit card payment, credit card refund, pre-paid card payment, pre-paid card refund and verification of identity.

In an aspect, a system for verifying a transaction may include: a payment resource including at least one processor and at least one memory, the payment resource adapted to: receive, at a payment resource, indicia of initiation of the transaction; generate, by the payment resource, a transaction identifier for the transaction; associate, by the payment resource, the transaction identifier with a verification information; communicate the transaction identifier to a customer device, wherein the customer device can be a wireless device; provide the verification information to the customer device; and receive, by the payment resource, an authentication information originating from the customer device. In embodiments, the communication of the transaction identifier to a customer device can occur via a POS device.

In an aspect, a system for verifying a transaction may include: a payment resource including at least one processor and at least one memory, the payment resource adapted to: initiate the transaction from a payment resource, wherein the transaction can be one or more from the set containing: debit card transaction, credit card transaction, pre-paid card transaction and verification of identity; generate a transaction identifier for the transaction by the payment resource; associate the transaction identifier with a verification information by the payment resource; communicate the transaction identifier to a customer device, wherein the customer device can be a wireless device and the transaction identifier can be one or more from the set containing: alphanumeric code, QR code, near field communication and application execution push notification; provide the verification information from the payment resource to the customer device, wherein the verification information includes one or more from the set containing: merchant identity information, merchant location information, transaction amount, calculated risk and POS device information; and receive an authentication information by the payment resource originating from the customer device, wherein the authentication information includes one or more from the set containing: a PIN and biometric recognition.

In an aspect, a system for verifying a transaction may include: a payment resource including at least one processor and at least one memory, the payment resource adapted to: receive indicia of an initiation of the transaction; communicate a transaction identifier for retrieval of verification information; and receive an authentication information. In embodiments, the payment resource can be further adapted to generate the transaction identifier. The payment resource can be further adapted to provide a verification information.

In an aspect, a system for verifying a transaction may include: a payment resource for receiving indicia of an initiation of a transaction; generating a transaction identifier; communicating the transaction identifier; providing a verification information; and receiving an authentication information. In embodiments, the system can further include a POS device for communicating the transaction identifier. The transaction identifier can be communicated to a customer device. The verification information can be provided to a customer device. The authentication information can be received, at least one of directly and indirectly, from a customer device. The verification information can include merchant location information. The transaction identifier can be one or more of an alphanumeric code, a QR code, a near field communication and a push notification. The transaction identifier can include a push notification thereby loading a URL on a customer device. The communication of the transaction identifier can include a push notification thereby executing an application on a customer device. The receiving authentication information can follow entry of a PIN.

BRIEF DESCRIPTION OF THE DRAWINGS

FIG. 2 depicts an embodiment of a home page of an administrator.

FIG. 6 depicts an embodiment of entry of authentication information utilizing a quick response (QR) code.

FIG. 7 depicts an embodiment of entry of authentication information utilizing a push notification.

FIG. 8 depicts an embodiment of entry of authentication information utilizing an application execution and biometric authentication.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
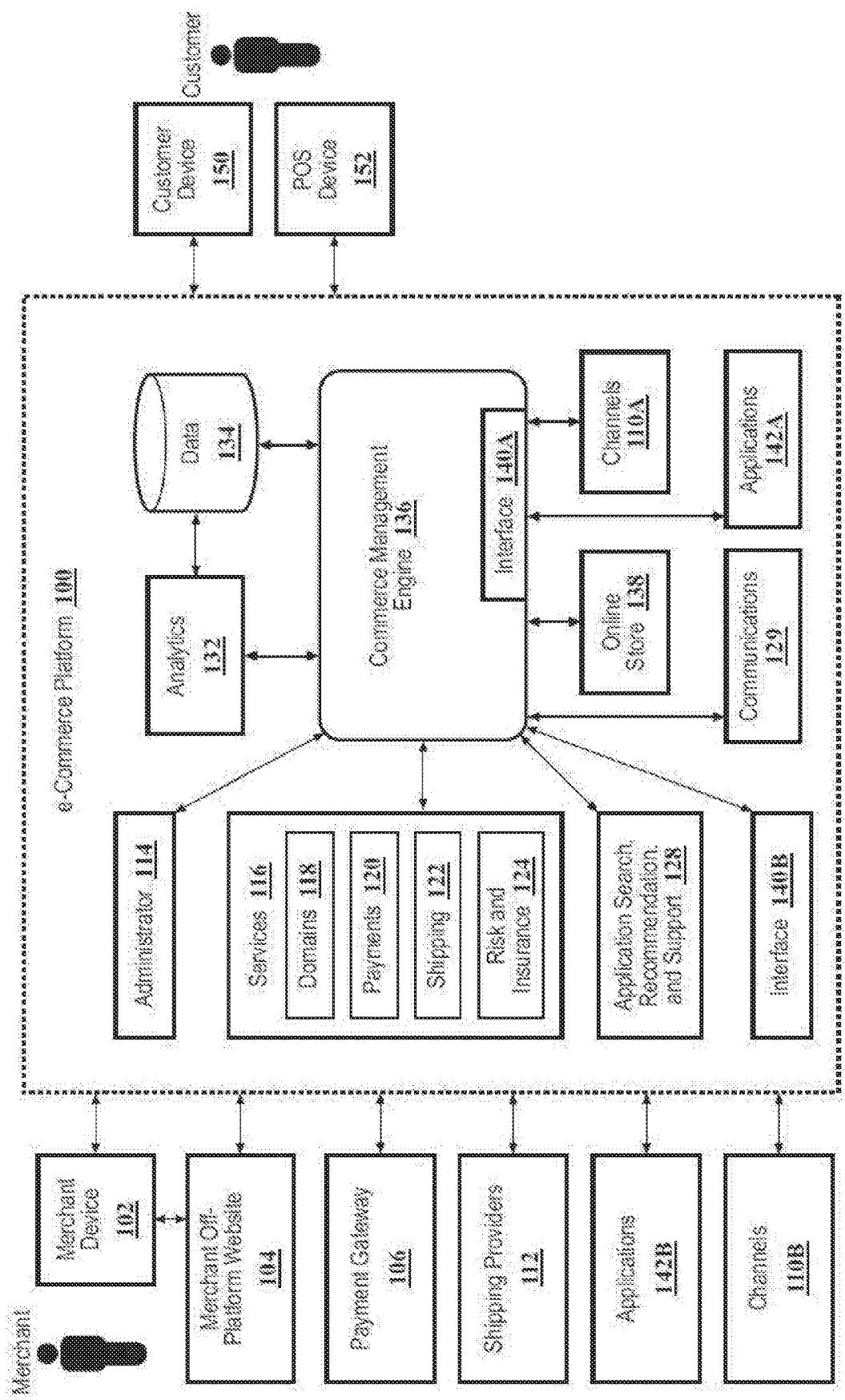
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
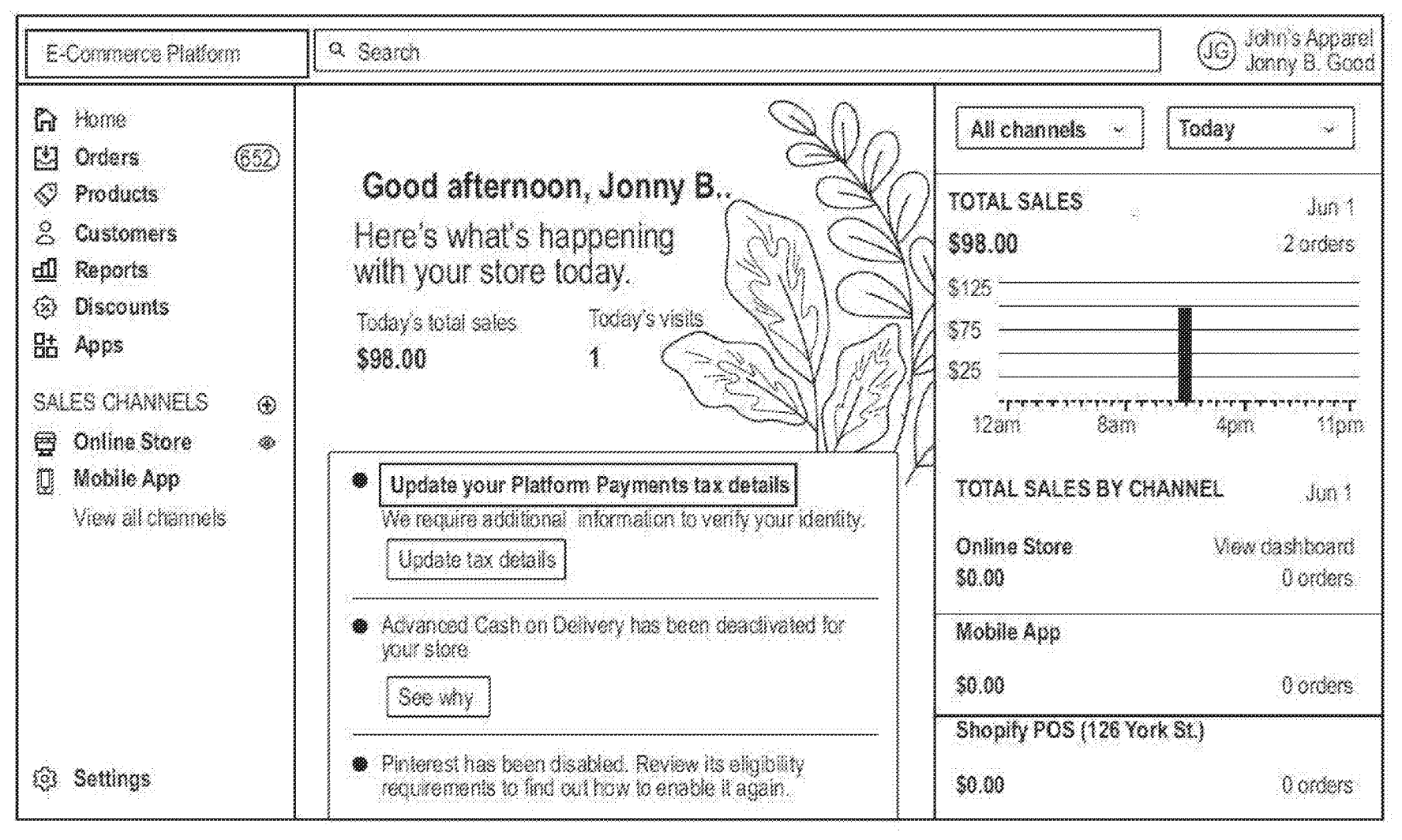

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

As various aspects of the e-commerce platform 100 have been discussed, the disclosure will now focus on a review of prior art approaches, an overview of embodiments of entry of authentication information, followed by more detailed embodiments of entry of authentication information.

Figure 3B:
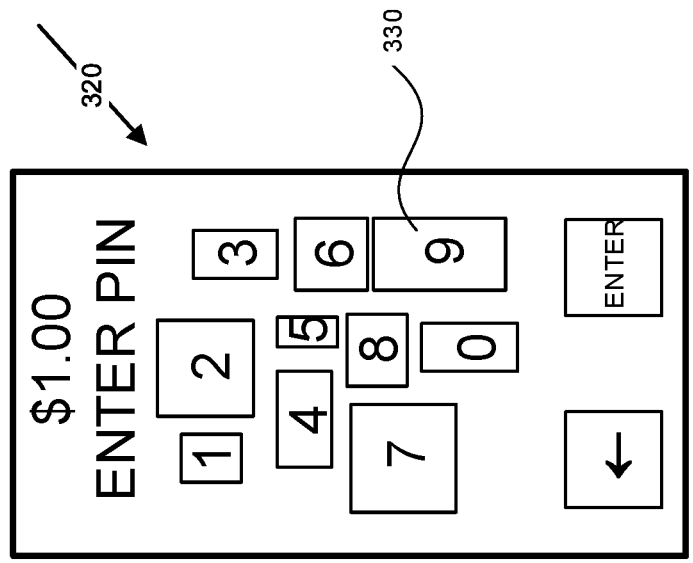
FIGS. 3A and 3B depict prior art approaches to PIN entry.
Figure 3A:
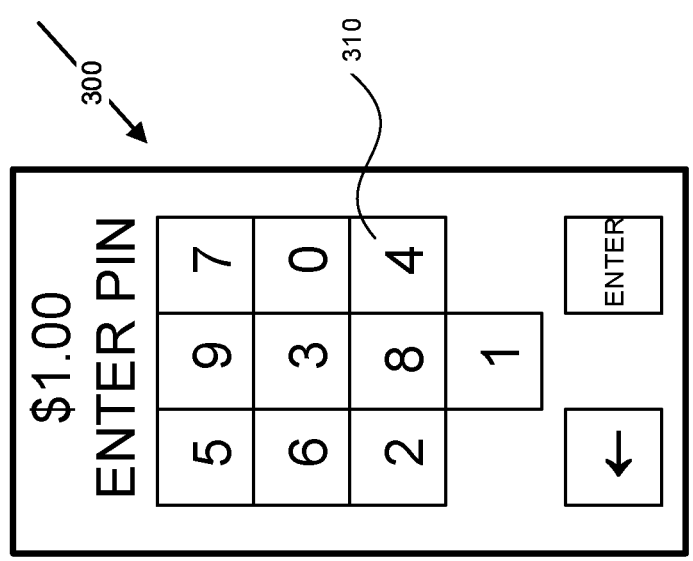

With reference to FIG. 3A, a prior art COTS POS device 300 is shown, including a scrambled numeric keypad 310. The scrambled numeric keypad 310 illustrates that numbers on the scrambled numeric keypad 310 are out of normal sequence, such that the location of each number randomly changes for different transactions (not shown). The purpose of randomly changing locations for numbers within the scrambled numeric keypad 310 is to make it more difficult for a third party (not shown) to capture the PIN of a customer (not shown) who is verifying a transaction with the POS device 300.

Similarly, turning to FIG. 3B, a prior art COTS POS device 320 is shown, including a random-sized numeric keypad 330. The random-sized numeric keypad 330 illustrates that numbers on the random-sized numeric keypad 330 are of different sizes, proportions or placements, such that the size and relative location of each number changes for different transactions (not shown).

As noted, repositioning number locations on the scrambled numeric keypad 310 or varying sizes and alignments of the numbers on the random-sized numeric keypad 330 results in more difficulty for the customer to input their PIN as in both cases, it can be difficult to repeat a memorized pattern of a PIN, causing additional time, complications or failures during the transaction verification process.

Figure 4:
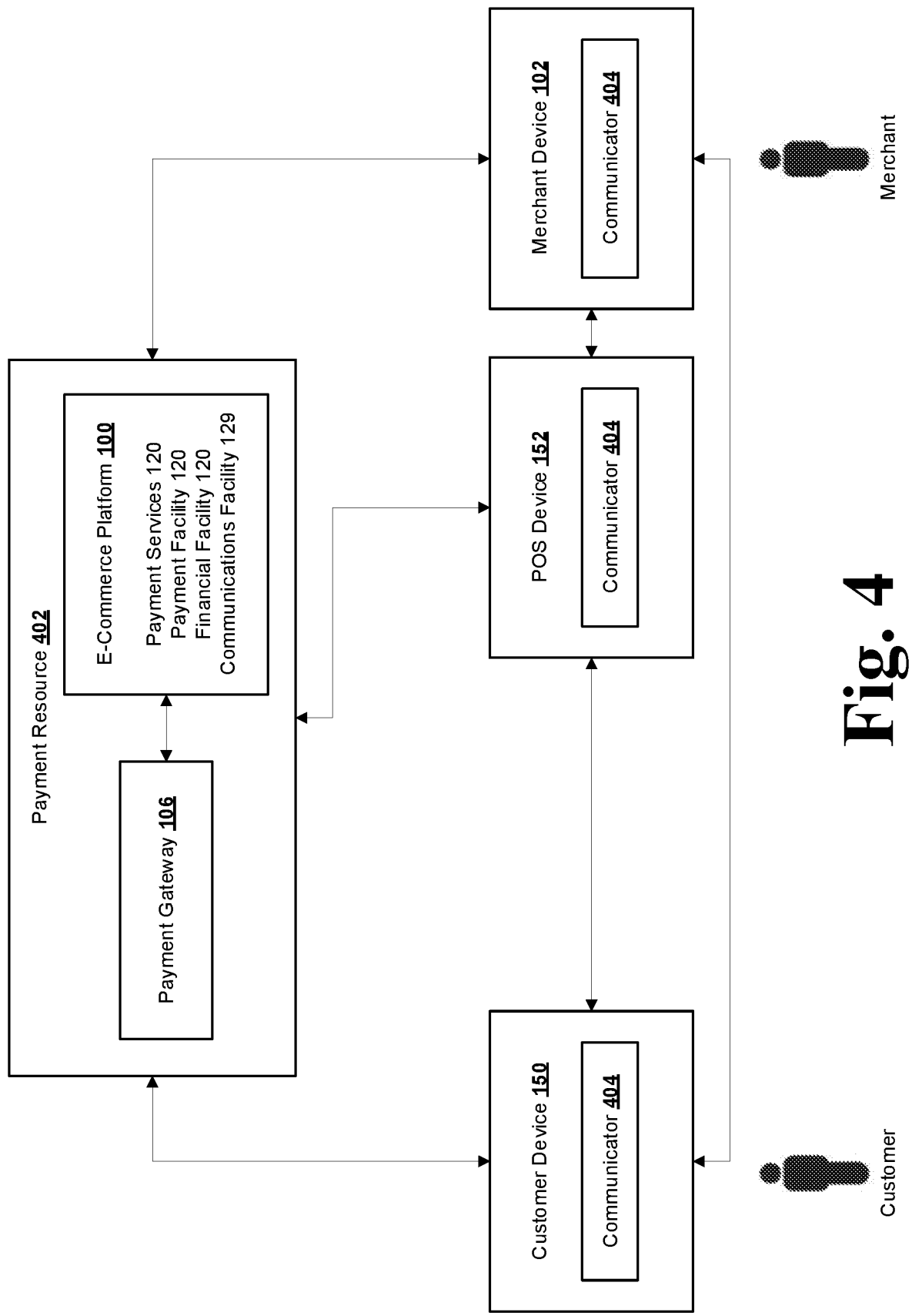
FIG. 4 depicts an embodiment in an architecture view.

Referring to FIG. 4, a payment resource 402, a customer device 150, a POS device 152 and/or a merchant device 102 may be in communication (such as by direct wireless or wired connection or through a network). In embodiments, a payment resource 402 may be any resource, system or service for processing transactions, such as debit card transactions, credit card transactions, pre-paid card transactions, verification of identity, purchases, sales, refunds and the like. In embodiments, the payment resource 402 may include an e-commerce platform 100 and/or resources, systems or services external to the e-commerce platform 100 such as a payment gateway 106 as described herein. In embodiments, the e-commerce platform 100 may include payment services 120, a payment facility 120, a financial facility 120 and/or a communications facility 129 as described herein. In embodiments, a customer device 150 may be a mobile and/or wireless device, a smart phone, a smart watch, a tablet, a laptop computer, a desktop computer, a PC, an electronic appliance, an electronic personal assistant, or any other form of wearable or stand-alone device. In embodiments, the customer device 150, POS device 152 and merchant device 102 include or are capable of some form of communication, such as a keyboard and/or visual, graphic, optical, audio, radio frequency, laser, or other communication means. For example, in some embodiments, a customer device 150 may be a smart phone having a keyboard (for example, an actual hardware keyboard or configured to present a keyboard on a screen for touch screen input) for entry of an alphanumeric transaction identifier, a smart phone having a camera configured to scan a matrix or two-dimensional code (e.g. a QR code) or a smart phone capable of receiving a Near-Field Communication (NFC) (or other wireless) signal such as from a POS device 152.

In embodiments, a POS device 152 may be used to initiate or otherwise participate in a transaction. In embodiments, a POS device 152 may be directly connected to the payment resource 402, such as through a wired connection, wireless connection or a network. In embodiments, a POS device 152 may have a conventional PIN keypad and include some form of communication functionality (e.g. visual, graphic, radio, laser, optical, sound, tactile, etc.) or network connectivity. In embodiments, the POS device 152 may have a screen display (such as for presenting an alphanumeric code or QR code), a speaker or other sound emitter (such as for audible transaction identifiers), NFC components, wireless network components (such as for wi-fe, cellular network, Bluetooth, etc.), wired network components (e.g. Ethernet port), or other communication capabilities suitable to display, emit, send or transmit a transaction identifier either to a customer or a customer device and receive information (such as authentication information) regarding a transaction.

In embodiments, a merchant device 102 may be used to initiate or otherwise participate in a transaction. In embodiments, a merchant device 102 may be directly connected to the payment resource 402, such as through a wired connection, wireless connection or a network. In embodiments, a merchant device 102 may connect a POS device 152 to the payment resource 402. In embodiments, each of the payment resource 402 (such as through a communications facility 129), POS device 152 and merchant device 102 may include a communicator 404. The communicator 404 may be of visual, optical, audio, radio frequency, wireless, wired or other communication means suitable to display, emit or transmit and receive information (such as alphanumeric, graphic, sound, optical, electronic or other messages, including a transaction identifier, verification information and authentication information).

In embodiments, a transaction identifier may be an item of information that allows for identification of a transaction. In embodiments, a transaction identifier may uniquely identify a particular transaction and may be for one-time use for that particular transaction. In embodiments, a transaction identifier may take into account one or more of the existence of the transaction, the details of the transaction (such as the good or services involved and the price), the merchant(s), the location(s), the merchant device(s) 102, the POS device(s) 152, the identity of the customer (if known). In embodiments, a transaction identifier may function as a reference (such as a string of characters, including an alphanumeric string) to look-up, retrieve or obtain verification information such as from the payment resource 402, a data facility 134 or an application (or a combination thereof). In embodiments, this may allow a customer to make an informed decision as to the security, fraud or other risks before a particular transaction is authorized (as further described herein). Thus, in embodiments, a transaction identifier can be used for both retrieval or providing of verification information. In embodiments, a transaction identifier may be a pointer (such as a URL, web address or QR code) to obtain verification information. In embodiments, the transaction identifier may encode information regarding a transaction, including any of the transaction, the details of the transaction (such as the good or services involved and the price), the merchant(s), the location(s), the merchant device(s) 102, the POS device(s) 152, the identity of the customer (if known). In embodiments, a transaction identifier may be or include a push notification or cause a push notification to be sent (such as a notification, text message or email received on a mobile device). In embodiments, the push notification may include information (such as a URL or instructions) to allow a customer device 150 to open a specific web page or execute an application (and go to a particular location in or display a particular screen of the application).

In embodiments, a transaction identifier may be communicated in many different ways. For example, a transaction identifier may be communicated as an alphanumeric code, a QR code, an audible sound, as a near field communication, as a radio communication (e.g. over cellular, wi-fi, Bluetooth and the like), over a wired connection, wireless connection or using a network. In embodiments, an alphanumeric code transaction identifier can be displayed on a POS device 152, such that a customer can then input the alphanumeric code into a customer device 150 or elsewhere. In another embodiment, a QR code transaction identifier can be displayed or presented on a POS device 152, such that a customer can use a camera on a customer device 150 (such as a smart phone) to scan the QR code into the customer device 150. In another embodiment, near field communication (or other wireless) signals can be used to transmit the transaction identifier to the customer device 150 by direct wireless transmission. In another embodiment, an audio signal may be emitted by the POS device 152 and sensed by a microphone of the customer device 150. In yet other embodiments, network connectivity (e.g. cellular network, Wi-Fi network, wired network, etc.) can be used directly or indirectly to communicate the transaction identifier from the POS device 152 to the customer device 150. Throughout references to a POS device 152 in reference to a transaction may instead be to a merchant device 102 which may be used instead of or in addition to a POS device 152.

In embodiments, verification information may include information that may assist a customer in making an informed decision as to the security, fraud or other risks of a particular transaction and with determining if the customer or customer device 150 should provide or cause to be provided the authentication information. In embodiments, verification information may include information about the transaction (such as the goods or services involved and the price of each), information about the merchant (such as the identity and location of the merchant), information about the POS device 152 and/or merchant device 102 (such as the expected location of the device and whether the device has been modified, tampered with or jailbroken) and a security, fraud or other risk rating.

In embodiments, authentication information may include information that allows for verification of the identity of the customer, which may in turn allow a transaction to proceed. In embodiments, authentication information may include a personal identification number or PIN number (which may be a string of numbers, letters and/or other characters) such as a PIN associated with a particular credit, debit or pre-paid card, payment device or account. In embodiments, authentication information may be a biometric measure such as facial recognition, finger/thumb print scanning, iris/retina scanning, voice recognition or gait recognition. In embodiments, a biometric measure may be detected or determined by a smartphone, computer or mobile computing device. In embodiments, authentication information may be entered by a customer (such as incident to a particular transaction or in advance of a transaction), provided by a customer device 150 (such as automatically when certain criteria are met) or detected by a customer device 150 or other device.

Figure 5:
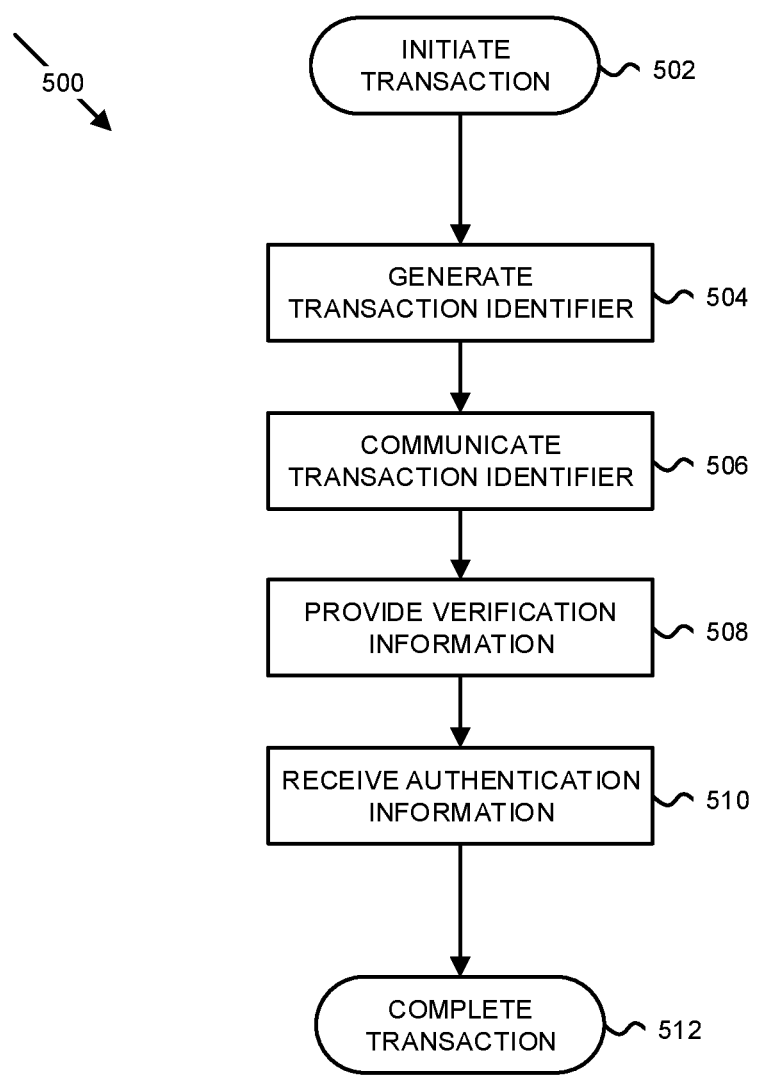
FIG. 5 is a flowchart depicting an embodiment of entry of authentication information.

Referring to FIG. 5, a flowchart illustrating certain steps in the process of verifying or completing a transaction is provided. Note that some or all of these steps may be performed by one or more of the payment resource 402, the POS device 152 and/or merchant device 102. In step 502 a transaction is initiated, such as by or involving the payment resource 402, the POS device 152 and/or merchant device 102. In step 504 a transaction identifier is generated. In embodiments, the transaction identifier may be generated by the payment resource 402 and may be associated, in whole or in part, by the payment resource 402 with verification information. In other embodiments, the transaction identifier may be generated by the POS device 152 or merchant 102.

In step 506 the transaction identifier may be communicated, including in any manner described herein. In embodiments, the transaction identifier may be communicated to the customer device 150 from a POS device 152, merchant device 102 and/or payment resource 402. In embodiments, such communication may be direct between the devices (including where a user inputs information provided on or by one device into another device) or may be indirect (such as through the payment resource 402). In embodiments, such communication may be in a push manner. For example, when the identity of the customer and/or customer device 150 is known (e.g. using an email address or phone number of the customer), the transaction identifier may be pushed or sent (e.g. by email, text message, connection to an application, etc.), such as by the payment resource 402, to all devices associated with that customer or to the particular customer device 150. In embodiments, the transaction identifier may be configured to allow retrieval of verification information (as further described herein).

In step 508 verification information may be provided or obtained, for example provided by or obtained from the payment resource 402. In embodiments, the transaction identifier may be used, for example by the customer device 150, to obtain the verification information. For example, the transaction identifier may be used to obtain the verification information from a database, may be used to navigate to a webpage containing or leading to the verification information or may be input into an application or cause an application to be launched which in turn provides the verification information. In embodiments the database, webpage and application may be part of or connected to the payment resource 402. In embodiments where information was encoded into the transaction identifier, the transaction identifier may be decoded to provide verification information. A customer (not shown), customer device 150 or other device may use the verification information to assess the risk associated with the transaction, including as described herein, and may decide whether or not to provide the authentication information, such as to the payment resource 402 to authorize and complete a transaction. If the authentication information is not provided within a certain amount of time the transaction may timeout or end.

If a decision is made to provide the authentication information, in step 510, it may be provided in any of a number of different ways. In embodiments, the authentication information may be input or provided directly to the payment resource 402, the POS device 152 and/or merchant device 102. For example, a customer may enter a PIN directly into a POS device 152. In embodiments, the authentication information may be provided by a customer on a customer device 150 (such as input into a webpage or into an application) and then provided to the payment resource 402 for processing without the authentication information being provided to the POS device 152 and/or merchant device 102. In other embodiments, the authentication information may be provided directly, and possibly automatically if certain criteria are met, by the customer device 150 to the payment resource 402 or directly to the POS device 152 and/or merchant device 102 possibly through a communicator 404. In step 512 if the authentication information matches what was expected the transaction is completed.

In embodiments, it may be desirable to configure various thresholds such that authentication is either abbreviated or not necessary to be provided, thus omitting step 510 or other aspects of the process. In one embodiment, a transaction amount threshold can be set such that transactions under a certain amount are automatically approved without the need for authentication information to be received. For example, in such an embodiment, transactions under twenty dollars ($20) can be configured to be automatically approved without the need for authentication information to be received. Or in other embodiments, it may be preferable to have a simple action (e.g. single button push) to authenticate the transaction rather than entry of a PIN or other authentication information. Such a feature provides convenience and speed for both the customer and the payment resource 402.

In other embodiments, it may be desirable to configure a threshold based on a calculated risk of a given transaction based on any one or more of any aspect or all of the verification information, a customer, a merchant, an account, a transaction amount, a transaction location, a set of goods/services that are associated with the transaction or other factors related to a transaction. Such a transaction risk threshold can thereby be implemented to serve the purposes similar to a transaction amount threshold, wherein the transaction is either automatically approved and authenticated (including without user input), or a simple action (e.g. single button push) is substituted, due to a lower calculated risk of the transaction as compared against a pre-configured transaction risk threshold.

In other embodiments, whether or when entry of authentication information is required can also be configured based on the transaction type (e.g. purchase, return or identity verification), or type of transaction (e.g. verify identity or age for legal purposes, transaction related to controlled goods such as alcohol, tobacco, drugs or firearms, etc.).

FIG. 6 illustrates an embodiment of PIN entry utilizing a QR code for communication. FIG. 6 is a conceptual illustration having a POS device 152 and a customer device 610, a customer device 620 and a customer device 630. The customer device 610, the customer device 620 and the customer device 630 are all the same smartphone which is a customer device 150, just shown at different moments in time during the transaction verification process.

The POS device 152 includes a numeric keypad 602 typically used for native transaction verification, and a communicator 404. More particularly as shown, the communicator 404 on the POS device 152 is a display capable of rendering a QR code for the customer device 610 to scan and receive via a communicator 404.

In embodiments, the POS device 152 first displays a transaction identifier 616 specifically associated to a pending transaction (not shown) via the communicator 404 utilizing a QR code as shown. The transaction identifier 616 is received by the customer device 610 through the communicator 404 (e.g. camera scan) on the customer device 610.

As illustrated in FIG. 6, after the QR code is received by the communicator 404 on the customer device 610, the customer device 610 derives a URL 625 which is placed into an address bar 624 of a browser 622 on the customer device 620.

Upon loading the first URL 625 on the browser 622, a verification information 626 is displayed in the browser 622. As illustrated, the verification information 626 contains merchant location information on a map for purposes of confirming the transaction to be verified.

At this point a customer may decide to enter the PIN directly into the POS device 152 or may proceed forward as shown using the "Enter PIN" button 628 to proceed to the next screen of entering a PIN. The action of pressing the proceed button 628 thereby loads a second URL 635 into the address bar 624 of the browser 622 of the customer device 630, wherein the PIN entry content 636 is displayed in the browser 622 of the customer device 630. From the PIN entry content 636 in the customer device 630, the customer (not shown) can enter their PIN (not shown) on the customer device 630 and complete authentication of the transaction (not shown).

For purposes of illustration, the review of verification information (e.g. merchant location on a map as shown) and entry of PIN screens have been shown on separate browser screens on the customer device 620 and the customer device 630, respectively. However, in some embodiments the functionality provided by the customer device 620 and customer device 630 can be combined into a single device or screen (not shown), or alternatively combined with other additional devices or screens as needed for a particular application.

This combination of screens is also applicable to other embodiments described herein.

FIG. 7 illustrates an embodiment of PIN entry, similar to FIG. 6 in many respects, but utilizing a push notification in connection with the transaction identifier 716 rather than a QR code. FIG. 7 is a conceptual illustration having a similar POS device 152 and a customer device 710, a customer device 620 and a customer device 630. The customer device 710, the customer device 720 and the customer device 730 are all the same smartphone and customer device 152, just shown at different moments in time during the transaction verification process.

The POS device 152 includes a communicator 404. The communicator 404 shown in this illustration is capable of communicating with a network connectivity 740 (e.g. wired or non-wired network, wi-fi, Bluetooth, etc.). As also illustrated, the customer device 710 can also communicate with the network connectivity 740, thereby providing a communication capability between the POS device 152 and the customer device 710.

In the illustrated embodiment, the POS device 152 communicates the push notification transaction identifier 716, specifically associated to a pending transaction (not shown) via the communicator 404 to the customer device 710.

Via the network connectivity 740, the transaction identifier 716 is received by the customer device 710 through the communicator 404. The customer device 710 can require attention from a customer (as shown) to proceed, or can be configured to automatically proceed without customer intervention to the next step below.

Following receipt of the transaction identifier 716 by the customer device 710, in preferred embodiments a browser page is loaded into the customer device 710 derived from the transaction identifier 716. More particularly, a browser is launched with a specific URL from the transaction identifier 716, or it can take the form of launching an application (or app) that handles the notification, or it can be configured to take other actions as necessary for a particular application.

In the former case, as shown in FIG. 7, a first URL 625 is derived from the transaction identifier 716 and loaded into the address bar 624 of the browser 622 on the customer device 620. From this point, with respect to FIG. 6, the customer devices, browser screens, content screens and steps of FIG. 7 are all identical to those detailed in FIG. 6 to complete the transaction verification process.

FIG. 8 illustrates a similar embodiment to FIG. 7 in many respects; however, the embodiment illustrated in FIG. 8 utilizes application execution technology rather than browser technology to perform various computing and user interface steps, and further utilizes biometric recognition rather than PIN entry for identity authentication.

FIG. 8 is a conceptual illustration having a POS device 152, a customer device 810, a customer device 820 and a customer device 830. The customer device 810, the customer device 820 and the customer device 830 are all the same smartphone and customer device 150, just shown at different moments in time during the transaction verification process.

The communicator 404 on the POS device 152 and customer device 810 is preferably of wireless network connectivity similar to the previous communicator 404 of FIG. 7, but configured to communicate a transaction identifier associated with application execution 816 containing instructions to launch or execute an application 822 upon the customer device 820.

In this illustration an application execution push notification 816 is received by the customer device 810 via a network connectivity 740. The customer device 810 can require attention from a customer (as shown) to proceed, or the customer device 810 can automatically proceed to execute the action, namely executing an application 822 on the customer device 820.

The application 822 loosely parallels the purposes and functions of the browser 622 in FIGS. 6 and 7 for completing verification of the transaction. At a top level, the application 822 includes a verification information 626 and a proceed button 628, similar to the purposes and function of the verification information 626 proceed button 628 in FIGS. 6 and 7. However, upon pressing the proceed button 628 on customer device 820, the customer device 830 performs a determination of biometric recognition 836 within the application 822 (such as facial recognition as illustrated in FIG. 8). As illustrated on the application 822 screen, the identity of the customer was authenticated and the transaction was completed by sending authentication information (not shown) to the payment resource 402 (not shown in this figure).

At a top level, all three FIGS. 6, 7 and 8 disclose embodiments where entry of a PIN, biometric recognition or other authentication is performed by a customer device rather than a POS device. One skilled in the art can appreciate the many benefits rendered by using a customer device rather than a POS device for verification of transactions. In one aspect, verifying or completing transactions through a customer device affords the opportunity to confirm the identity of the merchant before the transaction (not shown) is completed and authentication information is provided.

Additionally, a customer device is less likely to be compromised by visual snooping or visual surveillance (e.g. watching eyes, mounted camera, etc.) during the PIN entry, and also less likely to be compromised by unauthorized electronic surveillance (e.g. sniffers, magnetic skimmers, etc.) or rogue applications that could be unknowingly configured on or near the POS device.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method of verifying a transaction comprising the steps of:

receiving, at a server-based payment resource from a point of sale (POS) device, indicia of an initiation of a customer transaction;

generating a transaction identifier by the server-based payment resource responsive to receiving the indicia, wherein the transaction identifier includes transaction information that allows for identification of the customer transaction;

communicating, by the server-based payment resource, the transaction identifier to the POS device for communication to a customer device by the POS device;

receiving the transaction information at the server-based payment resource from the customer device;

determining, by the server-based payment resource, that the received transaction information from the customer device matches the transaction information included in the generated transaction identifier;

responsive to the determining that the received transaction information received from the customer device matches the transaction information included in the generated transaction identifier, generating, by the server-based payment resource, verification information including merchant location information;

providing, by the server-based payment resource, the verification information to the customer device, wherein the verification information includes information for use by the customer device to present a geographic map illustrating a location of the POS device to obtain confirmation of the transaction to be verified;

receiving, at the server-based payment resource, an authentication information from the POS device; and determining, by the server-based payment resource, that the authentication information originates from the customer device and is within a defined period of time originating from when the verification information was provided to the customer device.

2. The method of claim 1, wherein the customer transaction is initiated using at least one of the server-based payment resource, a merchant device and the POS device.

3. The method of claim 1, wherein the transaction identifier is one or more of an alphanumeric code, a QR code, a near field communication and a push notification.

4. The method of claim 1, wherein the transaction identifier loads a URL on the customer device to transmit the transaction information to the server-based payment resource.

5. The method of claim 1, wherein communicating the transaction identifier to the customer device by the POS device comprises a push notification thereby executing an application on the customer device.

6. The method of claim 1, wherein the step of receiving authentication information comprises entry of a PIN only if the transaction exceeds a pre-configured transaction risk threshold.

7. The method of claim 1, wherein the authentication information comprises biometric recognition.

8. A method of verifying a transaction comprising the steps of:
- initiating a customer transaction from a server-based payment resource, wherein the customer transaction is one or more from the set containing: debit card transaction, credit card transaction, pre-paid card transaction and verification of identity;
- generating a transaction identifier for the transaction by the server-based payment resource responsive to initiating the customer transaction, wherein the transaction identifier includes transaction information that allows for identification of the customer transaction;
- associating the transaction identifier with a verification information by the server-based payment resource;
- communicating, by the server-based payment resource, the transaction identifier to a point of sale (POS) device for communication to a customer device by the POS device, wherein the transaction identifier is one or more from the set containing: alphanumeric code, QR code, near field communication and application execution push notification;
- receiving the transaction information at the server-based payment resource from the customer device;
- determining, by the server-based payment resource, that the received transaction information from the customer device matches the transaction information included in the generated transaction identifier communicated to the POS device;
- responsive to the determining that the received transaction information received from the customer device matches the transaction information included in the generated transaction identifier, generating, by the server-based payment resource, verification information including merchant location information;
- providing the verification information from the server-based payment resource to the customer device, wherein the verification information includes information for use by the customer device to present a geographic map illustrating a location of the POS device to obtain confirmation of the transaction to be verified;
- receiving an authentication information by the server-based payment resource from the POS device; and
- determining, by the server-based payment resource, that the authentication information originates from the customer device, wherein the authentication information comprises one or more from the set containing: a PIN and biometric recognition.

9. The method of claim 8, further comprising:
- communicating, by the server-based payment resource to the customer device, a PIN entry content for presentation of a PIN pad by the customer device for entry of a defined PIN entry information on the PIN pad, and wherein the received authentication information at the server-based payment resource comprises the defined PIN entry information.

10. A system for verifying a transaction comprising:
- a server-based payment resource comprising at least one processor and at least one memory, the server-based payment resource adapted to:
  - receive indicia of an initiation of a customer transaction from a point of sale (POS) device;
  - generate a transaction identifier responsive to receiving the indicia, wherein the transaction identifier includes transaction information that allows for identification of the customer transaction;
  - communicate the transaction identifier to the POS device for communication to a customer device by the POS device;
  - receive the transaction information from the customer device;
  - determine that the received transaction information from the customer device matches the transaction information included in the generated transaction identifier;
  - responsive to the determining that the received transaction information received from the customer device matches the transaction information included in the generated transaction identifier, generate verification information including merchant location information;
  - provide the verification information to the customer device, wherein the verification information includes information for use by the customer device to present a geographic map illustrating a location of the POS device to obtain confirmation of the transaction to be verified;
  - receive an authentication information from the POS device; and
  - determine that the authentication information originates from the customer device and is within a defined period of time originating from when the verification information was provided to the customer device.

11. The system of claim 10, wherein the customer transaction is initiated using at least one of the server-based payment resource, a merchant device and the POS device.

12. The system of claim 10 further comprising:
- the server-based payment resource further adapted to communicate a PIN entry content for presentation of a PIN pad by the customer device for entry of a defined PIN entry information on the PIN pad, and wherein the received authentication information comprises the defined PIN entry information.

13. The system of claim 10, wherein the transaction identifier is one or more of an alphanumeric code, a QR code, a near field communication and a push notification.

14. The system of claim 10, wherein the transaction identifier when communicated loads a URL on the customer device that provides the verification information.

15. The system of claim 10, wherein the transaction identifier when communicated to the customer device by the POS device comprises a push notification thereby executing an application on the customer device.

16. The system of claim 10, wherein the step of receiving authentication information comprises entry of a PIN only if the transaction exceeds a defined transaction risk threshold.

17. The system of claim 10, wherein the authentication information comprises biometric recognition.

18. A method of verifying a transaction comprising the steps of:
receiving, at a processor of a payment resource from a point of sale (POS) device, indicia of an initiation of a customer transaction, the customer transaction from one or more from the set containing: debit card transaction, credit card transaction, pre-paid card transaction, and verification of identity; and
verifying, by the processor, the customer transaction, by:
generating a transaction identifier that includes transaction information that allows for identification of the customer transaction,
transmitting the transaction identifier to the POS device for communication to a customer device,
receiving the transaction information from the customer device within a defined period of time originating from when the transaction identifier was transmitted to the POS device,
comparing the received transaction information from the customer device to the transaction information included in the generated transaction identifier transmitted to the POS device to determine a match,
responsive to the determining that the received transaction information from the customer device matches the transaction information included in the generated transaction identifier, generating a verification data comprising information for use by the customer device to present a geographic map illustrating a location of the POS device to obtain confirmation of the transaction to be verified,
transmitting the verification information to the customer device with instructions to provide a defined authentication information to the POS device, and
receiving the defined authentication information from the POS device.

19. The method of claim 18, verifying, by the processor, the customer transaction, by further:
transmitting a PIN entry content to the customer device for presentation of a PIN pad by the customer device with instructions for entry of the defined authentication information as defined PIN entry information to be entered on the PIN pad, and wherein the received defined authentication information comprises the defined PIN entry information.

20. The method of claim 1 further comprising:
communicating, by the server-based payment resource to the customer device, a PIN entry content for presentation of a PIN pad by the customer device for entry of a defined PIN entry information on the PIN pad, and wherein the received authentication information at the server-based payment resource comprises the defined PIN entry information.

21. The method of claim 1, wherein the transaction identifier is generated to be communicated to the customer device by the POS device through one of a visual scanning of a code or a radio frequency transmission of a code.

22. The method of claim 8, wherein the transaction identifier is generated to be communicated to the customer device by the POS device through one of a visual scanning of a code or a radio frequency transmission of a code.

23. The system of claim 10, wherein the transaction identifier is generated to be communicated to the customer device by the POS device through one of a visual scanning of a code or a radio frequency transmission of a code.

24. The method of claim 18, wherein the transaction identifier is generated to be communicated to the customer device by the POS device through one of a visual scanning of a code or a radio frequency transmission of a code.

25. The method of claim 1, wherein the information for use by the customer device to present the geographic map illustrating the location of the POS device includes a representation of the geographic map illustrating the location of the POS device.

26. The method of claim 1, wherein the information for use by the customer device to present the geographic map illustrating the location of the POS device includes an indication of the location of the POS device for use in generating the geographic map illustrating the location of the POS device.

27. The method of claim 8, wherein the information for use by the customer device to present the geographic map illustrating the location of the POS device includes at least one of a representation of the geographic map illustrating the location of the POS device or an indication of the location of the POS device for use in generating the geographic map illustrating the location of the POS device.

28. The system of claim 10, wherein the information for use by the customer device to present the geographic map illustrating the location of the POS device includes a representation of the geographic map illustrating the location of the POS device.

29. The system of claim 10, wherein the information for use by the customer device to present the geographic map illustrating the location of the POS device includes an indication of the location of the POS device for use in generating the geographic map illustrating the location of the POS device.

30. The method of claim 18, wherein the information for use by the customer device to present the geographic map illustrating the location of the POS device includes at least one of a representation of the geographic map illustrating the location of the POS device or an indication of the location of the POS device for use in generating the geographic map illustrating the location of the POS device.

* * * * *